United States Patent [19]

Hansen

[11] 4,107,233

[45] * Aug. 15, 1978

[54] BLOCK COPOLYMER BLEND WITH CERTAIN ACRYLICS

[75] Inventor: David R. Hansen, Houston, Tex.

[73] Assignee: Shell Oil Company, Houston, Tex.

[*] Notice: The portion of the term of this patent subsequent to Feb. 13, 1994, has been disclaimed.

[21] Appl. No.: 718,996

[22] Filed: Aug. 30, 1976

[51] Int. Cl.$^2$ .................. C08L 51/00; C08L 27/00; C08L 75/00

[52] U.S. Cl. .................. 260/876 B; 260/859 R; 260/879; 260/880 B; 428/246; 428/251; 428/285; 428/286; 428/442; 428/457; 428/462; 428/463; 428/521; 428/522; 526/331

[58] Field of Search .................. 260/876 B, 879, 880; 526/331

[56] References Cited

U.S. PATENT DOCUMENTS

| | | | |
|---|---|---|---|
| 2,117,321 | 5/1938 | Hill | 526/331 |
| 3,595,942 | 7/1971 | Wald et al. | 260/880 |
| 4,007,311 | 2/1977 | Harlan, Jr. | 260/876 B X |

FOREIGN PATENT DOCUMENTS 1,188,922  4/1970  United Kingdom ............... 260/876 B

*Primary Examiner*—Thomas De Benedictis, Sr.
*Attorney, Agent, or Firm*—Dean F. Vance

[57] ABSTRACT

Blends of alkenyl arene - diene block copolymers with certain acrylic resins having a random copolymer structure exhibit improved adhesion to polyurethane cements and other substrates.

10 Claims, No Drawings

BLOCK COPOLYMER BLEND WITH CERTAIN ACRYLICS

BACKGROUND OF THE INVENTION

Block copolymers have been developed rapidly within the recent past, the starting monomers usually being monoalkenyl arenes such as styrene or alpha-methylstyrene and conjugated dienes such as butadiene and isoprene. A typical block copolymer of this type is represented by the structure polystyrene-polybutadiene-polystyrene (SBS). When the monoalkenyl arene blocks comprise less than about 55% by weight of the block copolymer, the product is essentially elastomeric. Moreover, due to the peculiar set of physical properties of such a block copolymer it can be referred to more properly as a thermoplastic elastomer. By this is meant a polymer which in the melt state is processable in ordinary thermoplastic processing equipment but in the solid state behaves like a chemically vulcanized rubber without chemical vulcanization having been effected. Polymers of this type are highly useful in that the vulcanization step is eliminated and, contrary to vulcanized scrap rubbers, the scrap from the processing of thermoplastic elastomers can be recycled for further use.

These block copolymers, because of their hydrocarbon composition, are non-polar in character. This non-polarity presents problems in adhesion, paintability, printability, and other performance requirements dependent on surface polarity. One means to achieve polarity is to blend polar resins with the block copolymer. However, not all polar resins are technologically compatible with the above-described block copolymers. Further, not all resins exhibit the desired characteristics for certain critical applications. A blend of block copolymers and a certain acrylic ester has now been found that not only exhibits improved adhesion, paintability and printability, but also forms translucent blends which have good rubbery characteristics and respectable tensile strengths.

SUMMARY OF THE INVENTION

The present invention is a polymer composition comprising 100 parts by weight of a block copolymer and about 1 to about 100 parts by weight of an acrylic resin wherein:

(a) said block copolymer has at least two monoalkenyl arene polymer end blocks A and at least one conjugated diene mid block B, said blocks A comprising 8-55% by weight of the block copolymer, each polymer block A having an average molecular weight of between about 5,000 and about 125,000, and each polymer block B having an average molecular weight of between about 10,000 and about 300,000; and (b) said acrylic resin is a random copolymer having an inherent viscosity of 0.05 to 0.40 as measured with a Cannon-Fenske viscometer with solutions of 0.5 grams of the acrylic in 100 mililiters of chloroform. The copolymer has the structure.

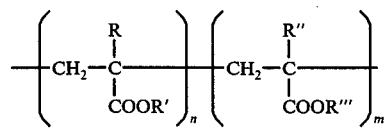

where R, R', R", and R'" are selected from the group consisting of hydrogen and $C_1$ to $C_4$ alkyls, R' differs from R'", and the ratio of n to m varies from about 1 to about 8, preferably about 4.

Compositions according to the present invention possess a unique set of properties that are very useful in certain critical applications. These compositions exhibit much improved adhesion to leather substrates bonded with polyurethane cements, in addition to possessing much improved printability and paintability. Further, the compression molded compositions are translucent and do not whiten when stretched, contrary to the typical behavior of most polymer blends.

DETAILED DESCRIPTION OF THE INVENTION

The block copolymers employed in the present composition are thermoplastic elastomers and have at least two monoalkenyl arene polymer end blocks A and at least one elastomeric conjugated diene polymer mid block B. The number of blocks in the block copolymer is not of special importance and the macromolecular configuration may be linear, graft or radial depending upon the method by which the block copolymer is formed. Typical block copolymers of the most simple configuration would have the structure polystyrene-polyisoprene-polystyrene and polystyrene-polybutadiene-polystyrene. A typical radial polymer would comprise one in which the diene block has three or more branches, the tip of each branch being connected to a polystyrene block. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene. A much preferred conjugated diene is butadiene.

The average molecular weights of each of the blocks may be varied as desired. The monoalkenyl arene polymer blocks preferably have average molecular weights between about 5,000 and 125,000, more preferably between about 15,000 and about 100,000. The elastomeric conjugated diene polymer blocks preferably have average molecular weights between about 15,000 and about 250,000, more preferably between about 25,000 and about 150,000. The average molecular weights of the polystyrene end blocks are determined by gel permeation chromotography, whereas the polystyrene content of the polymer is measured by infrared spectroscopy of the finished block polymer. The weight percentage of the thermoplastic monoalkenyl arene blocks in the finished block polymer should be between about 8 and 55%, preferably between about 10% and about 30% by weight. The general type and preparation of these block copolymers are described in U.S. Re. 28,246 and in many other U.S. and foreign patents.

The block copolymers useful in the compositions of this invention may also be hydrogenated either selectively, randomly or completely. Selected conditions may be employed, for example, to hydrogenate the elastomeric diene center block while not so modifying the monoalkenyl arene polymer blocks. Two examples of hydrogenated polymers are polyvinylcyclohexane-hydrogenated polybutadiene-polyvinyl-cyclohexane and polystyrene-hydrogenated polybutadiene-polystyrene. Preferably blocks A are characterized in that no more than about 25% of the original aromatic double bonds are reduced by hydrogenation while blocks B are characterized by having at least 75% of the aliphatic double bonds reduced by hydrogenation. See generally U.S. Pat. No. 3,595,942.

The non-hydrogenated block copolymers of the above description are preferred since the acrylic resin appears to exhibit greater compatibility with the mid block of the unhydrogenated block copolymer than with the mid block of the hydrogenated block copolymer.

The acrylic resin employed is a random copolymer of two acrylic monomers. The acrylic resin has the structure

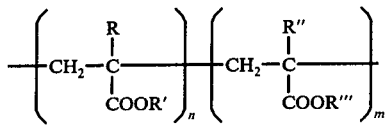

where R, R', R" and R'" are selected from the group consisting of hydrogen and $C_1$ to $C_4$ alkyls, R' differs from R'", and the ratio of $n$ to $m$ varies from about 1 to about 8, preferably about 4. Preferably R and R" are methyl groups. A much preferred acrylic resin is a random methyl methacrylate-n-butyl methacrylate copolymer (R, R', R" are methyl groups and R'" is a n-butyl group). This much preferred acrylic resin is commercially available from DuPont Chemical Company under the tradename ELVACITE 2013 ® Resin.

The acrylic resin may be produced by any suitable process. See, e.g. U.S. Pat. Nos. 2,117,321; 3,476,723; and 3,772,258.

The inherent viscosity of the acrylic resin varies from about 0.1 to about 0.4, preferably about 0.15 to about 0.3. This inherent viscosity is determined from a solution at 20° C which contains 0.5 grams of the acrylic per 100 mililiters of chloroform using a Cannon-Fenske viscometer. The inherent viscosity is defined as $\ln((\eta_{relative})/C)$ where $\eta_{rel}$ is the ratio of the solution viscosity to the solvent viscosity and C is the concentration in grams per deciliter. The molecular weight or inherent viscosity of the acrylic resin is important since too high molecular weight acrylics or too high inherent viscosity acrylics will not disperse well during mechanical mixing and thus produce blends with poor optical and mechanical properties.

The amount of acrylic resin employed varies from about 1 to about 100 phr (parts by weight per hundred parts by weight rubber or block copolymer), preferably about 5 phr to about 35 phr.

The acrylic resin and block copolymer are combined by either a melt blending or dry blending procedure. Solution blending does not typically result in a compatible blend since the two polymers are not thermodynamically compatible, and mechanical mixing is necessary for adequate dispersion. Melt blending refers to mixing the components at an elevated temperature, e.g. at about 150° C. Dry blending generally refers to a low shear mixing process wherein the compounding ingredients are blended together without the formation of a coherent mass and which results in a relatively free-flowing heterogeneous mixture of ingredients in particulate form.

The blended mixture may then be compression molded, injection molded or coextruded to form useful objects. The compositions according to the present invention may be coextruded with other polymers such as polystyrene, high nitrile resins, acrylates, nylons, or polyvinyldiene chloride. Due to the enhanced adhesion of the present compositions, these coextruded products show good integrity.

Due to the enhanced printability and paintability, compositions of the present invention are also very useful for applications such as in automobile components. The prior block copolymer compositions do not possess sufficient paintability for many of these applications.

The invention is further illustrated by means of the following illustrative embodiments, which are given for the purpose of illustration only and are not meant to limit the invention to the particular reactants and amounts disclosed.

ILLUSTRATIVE EMBODIMENT I

In Illustrative Embodiment I two different block copolymers are blended with three different acrylic resins. Block copolymer A is a three block styrene-butadiene-styrene block copolymer having a molecular weight distribution of about 10,000-50,000-10,000 and a styrene content of about 27% by weight. Block copolymer B is a three block styrene-isoprene-styrene block copolymer having a molecular weight distribution of about 10,000-125,000-10,000 and a styrene content of about 14% by weight. The acrylic resin employed is listed in Table 1 below.

Table 1

| | |
|---|---|
| ELVACITE ® 2013 | poly(methylmethacrylate-co-n-butyl methacrylate) by DuPont having an inherent viscosity of ≃ 0.19 |
| ELVACITE ® 2043 | poly(ethyl methacrylate) by DuPont, inherent viscosity ≃ 0.24 |
| ELVACITE ® 2008 | poly(methyl methacrylate) by DuPont, inherent viscosity ≃ 0.21 |

In runs 1, 2, 3 and 4, the block copolymer was tested alone - no acrylic resin was added. In run 5, 35 parts by weight of ELVACITE ®2013 was melt blended at 150°-160 C in a Brabender mixer for five minutes with 100 parts by weight of Block Copolymer B. Likewise, various other samples were prepared as listed in Table 2.

The various samples were compression molded at 140° C and subjected to five different tests: tensile strength at break (ASTM 412), elongation at break (ASTM 412), clarity, whitening when stretched, and adhesion. Clarity and whitening when stretched are both qualitative tests. The adhesion test involved gluing a piece of leather to the sample by means of a urethane adhesive (Bostik Supergrip ® 333 and 335), and then subjecting the laminate to a standard T peel test at 2 inches per minute rate. The results of the various tests are presented below in Table 2.

Table 2

| Run No. | Block Copolymer | Acrylic Resin | $T_B$ (psi) | $E_B$ (%) | Clarity | Whitening When Stretched | Adhesion (pli) |
|---|---|---|---|---|---|---|---|
| 1 | A, crumb | none | 4150 | 1000 | clear | no | less than 3 |
| 2 | A, processed in a Brablender | none | 2750 | 1125 | clear | no | less than 3 |
| 3 | B, crumb | none | 2675 | 1500 | clear | no | less than 3 |

Table 2-continued

| Run No. | Block Copolymer | Acrylic Resin | $T_B$ (psi) | $E_B(\%)$ | Clarity | Whitening When Stretched | Adhesion (pli) |
| --- | --- | --- | --- | --- | --- | --- | --- |
| 4 | B, processed in a Brablender | none | 1050 | 1500 | clear | no | less than 3 |
| 5 | B | ELVACITE®2013 (35 PHR) | 950 | 1150 | translucent | no | 13 |
| 6 | A | ELVACITE®2013 (35 PHR) | 2450 | 850 | translucent | no | 23 |
| 7 | A | ELVACITE®2013 (100 PHR) | 1550 | 700 | opaque | yes | 17 |
| 8 | A | ELVACITE®2008 (35 PHR) | 1450 | 400 | translucent | no | 8.0 |
| 9 | A | ELVACITE®2043 (35 PHR) | 2175 | 650 | translucent | no | 10 |
| 10 | A | ELVACITE®2013 (17 PHR) | 3000 | 925 | clear | no | 17 |
| 11 | A | ELVACITE®2013 (5 PHR) | 2775 | 900 | clear | no | 15 |

ILLUSTRATIVE EMBODIMENT II

In Illustrative Embodiment II ELVACITE® 2013 was blended with one block copolymer at two different concentrations and injection molded. Block copolymer A is the same as designated in embodiment I. The mixtures were preblended in a Banbury mixer at 300° F for 3 minutes. Injection molding was done at 275° F.

The samples were evaluated with the same tests as described in embodiment I. The various tests shown below in Table 3 show that the tensile properties are not as good as compression molded samples, but the adhesion is improved. Also, stress whitening is now observable.

Table 3

| Run No. | Block Copolymer | Acrylic | $T_B$ (psi) | $E_B(\%)$ | Clarity | Stress Stereo Whitening | Adhesion (pli) |
| --- | --- | --- | --- | --- | --- | --- | --- |
| 12 | A | none | (a) 3200 (b) 3350 | 1025 | clear | no | 3.0 |
| 13 | A | ELVACITE® 2013 (35 PHR) | (a) 1150 (b) 1850 | 525 | translucent | yes | 22–35 |
| 14 | A | ELVACITE® 2013 (17.5 PHR) | (a) 1600 (b) 1925 | 875 875 | translucent | some | 33–28 |

(a) parallel
(b) perpendicular

What is claimed:

1. A polymer composition comprising 100 parts by weight of a block copolymer and about 1 to about 100 parts by weight of an acrylic resin wherein:
   (a) said block copolymer has at least two monoalkenyl arene polymer end blocks A and at least one conjugated diene mid block B, said blocks A comprising 8-55% by weight of the block copolymer, each polymer block A having an average molecular weight of between about 5,000 and about 125,000, and each polymer block B having an average molecular weight of between about 10,000 and about 300,000; and
   (b) said acrylic resin is a random copolymer having an inherent viscosity of between about 0.1 and about 0.4, and having a structure

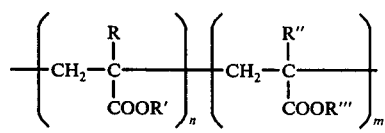

where R, R', R'', and R''' are selected from the group consisting of hydrogen and $C_1$ to $C_4$ alkyls, R' differs from R''', and the ratio of $n$ to $m$ varies from about 1 to 8.

2. A composition according to claim 1 wherein the amount of acrylic resin employed varies from about 5 to about 35 parts by weight.

3. A composition according to claim 1 wherein R, R' and R'' are methyl groups.

4. A composition to claim 3 wherein R''' is a n-butyl group.

5. A composition according to claim 4 wherein the inherent viscosity of the acrylic resin varies from about 0.15 to about 0.3.

6. A composition according to claim 4 wherein the conjugated diene is selected from the group consisting of butadiene and isoprene.

7. A composition according to claim 5 wherein the ratio of $n$ to $m$ is about 4.

8. A composition according to claim 1 wherein the block copolymer and acrylic resin are melt blended.

9. A composition according to claim 6 wherein the A blocks are polystyrene blocks.

10. A composition according to claim 9 wherein each polymer block A has an average molecular weight of between about 15,000 and about 100,000 and each polymer block B has an average molecular weight of between about 25,000 and about 150,000.

* * * * *